United States Patent Office 3,022,301
Patented Feb. 20, 1962

3,022,301
AMIDO-DIAMINES AND TRIAMINES
Moses Wolf Goldberg, Upper Montclair, and Sidney Teitel, Nutley, N.J., assignors to Hoffmann-La Roche Inc., Nutley, N.J., a corporation of New Jersey
No Drawing. Filed Oct. 20, 1959, Ser. No. 847,463
13 Claims. (Cl. 260—247.2)

This invention relates to amido-diamines and triamines. More particularly, the invention concerns triamines represented by the structural formula (I)
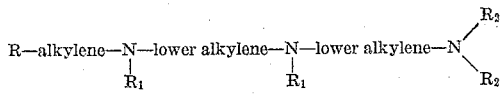

as well as acid addition salts and quaternary salts of said triamines.

R in the above formula represents the cyclic part of the saturated or unsaturated ionone, isoionone or irone structure, that is, a group such as 2,6,6-trimethyl-1-cyclohexen-1-yl, 2,5,6,6-tetramethyl-2-cyclohexen-1-yl, 2,6,6-trimethyl-2-cyclohexen-1-yl, 2,2,6-trimethylcyclohexyl, 2,2,3,6-tetramethylcyclohexyl, 2 - methyl-5-isopropyl-1-cyclopenten-1-yl and 2-methyl-5-isopropyl-1-cyclopentanyl. $R_1$ represents hydrogen or lower alkyl. The group

in Formula I represents a tertiary amino group wherein each $R_2$ represents a lower alkyl radical to form a dilower alkylamino group or the two symbols $R_2$ together join in a polymethylene or polymethyleneoxy structure which, with the tertiary nitrogen, form a saturated 5 or 6 membered nitrogen heterocyclic radical such as morpholinyl, piperidyl, pyrrolidyl and the like.

In the above formula, the lower alkyl, lower alkylene and alkylene groups are straight chain or branched chain saturated aliphatic hydrocarbon radicals of the alkane series. The lower alkyl and lower alkylene groups may have up to about 7 carbon atoms in the chain, whereas the alkylene groups may have longer chains, e.g. up to about 12 carbon atoms.

The triamines of Formula I may be produced by reductive condensation of an aminoalkylaminoalkanol such as 3-(2-hydroxyethylamino)propylamine, 2-hydroxyethylethylenediamine or the like with β-ionone or with β-$C_{14}$ aldehyde [4-(2,6,6-trimethyl-1-cyclohexen-1-yl)-2-methyl-2-buten-1-al] to form the corresponding di-secondary-diamino alcohol, followed by alkylation with formic acid-formaldehyde. The resulting di-tertiary-diamino alcohol is then halogenated, e.g. with thionyl chloride, and the halo-di-tertiary-diamine dihydrohalide is reacted with a dialkylamine to give the tri-tertiary amine.

As an alternative, a primary-secondary-tertiary triamine, e.g. N-(3-dimethylaminopropyl)-1,3-propanediamine or the like, may be reductively condensed with α-ionone, β-ionone, isoionone, α-irone, tetrahydroionone or tetrahydroisoionone, or with β-$C_{14}$-, β-$C_{16}$- or β-$C_{19}$-aldehyde to give the di-secondary-tertiary amines which may in turn be alkylated, e.g. with formic acid-formaldehyde, to produce the tri-tertiary amine.

When $R_1$ in Formula I represents a lower alkyl group, the compound of that structure is best obtained from the corresponding compound of Formula I, wherein $R_1$ is hydrogen, by reacting the latter either with formic acid-formaldehyde or an appropriate alkyl halide.

The compounds of Formula I may, in addition, be derived by reducing, for example with lithium aluminum hydride, a corresponding amido-diamine of the formula (II)
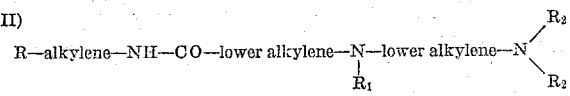

The symobls R, $R_1$ and $R_2$ and the alkyl and alkylene groups have the same meaning as in Formula I.

The amido-diamines corresponding to Formula II are novel compounds which are produced by reacting a dialkylaminoalkylamine with the appropriate haloacylamide. For example, 3-dimethylaminopropylamine, 2-diethylaminoethylamine, N-aminopropylmorpholine and the like will react with N-[1-methyl-3-(2,6,6-trimethyl-1-cyclohexen-1-yl)propyl]-α-chloroacetamide, N-[4-methyl-6-(2,6,6-trimethyl-1-cyclohexen-1-yl)hexyl] - α - chloroacetamide, N-[2,6-dimethyl-8 - (2,6,6-trimethyl-1-cyclohexen-1-yl)octyl]-α-chloroacetamide, N - [1-methyl-3-(2,2,6-trimethyl-cyclohexyl)propyl]-α-chloroacetamide or N-[1-methyl - 3 - (2,6,6-trimethyl-2-cyclohexen-1-yl)propyl]-α-chloroacetamide. The haloacylamides, used as intermediates, are prepared by the reductive condensation of the appropriate ketone or aldehyde, e.g. α-ionone, β-ionone, isoionone, tetrahydroionone, tetrahydroisoionone, β-$C_{14}$-aldehyde, β-$C_{16}$-aldehyde [6-(2,6,6-trimethyl-1-cyclohexen-1-yl)4-methyl-2,4-hexadien-1-al] or β-$C_{19}$-aldehyde [8-(2,6,6-trimethyl-1-cyclohexen-1-yl) - 2,6-dimethyl-2,4,6-octatrien-1-al], with ammonia, using Raney nickel catalyst, and reacting the resulting amine with a haloacyl chloride.

A preferred group of compounds within the class defined by Formula I are those triamines represented by the structural formula (III)
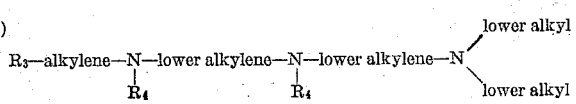

wherein $R_3$ represents a radical selected from the group consisting of 2,6,6-trimethyl-cyclohexen-1-yl and 2,2,6-trimethyl-cyclohexyl, and $R_4$ represents a member of the group consisting of hydrogen and lower alkyl, as well as acid addition salts and quaternary salts of these compounds. The corresponding amido-diamines also constitute a preferred group.

The amido-diamines and triamines form acid addition salts by reaction with inorganic or organic acids and quaternary salts by reaction with conventional quaternizing agents. Mono-acid addition salts and mono-quaternary salts as well as poly-acid addition salts and poly-quaternary salts may be produced. Illustrative of the acid addition salts are those formed from hydrohalic acids, e.g. hydrochloride, hydrobromide, etc., other mineral acid salts such as sulfate, nitrate, phosphate, etc., arylsulfonates such as benzenesulfonate, toluenesulfonate, etc., other organic acid salts such as tartrate, citrate, ascorbate, malate, oxalate and the like. The acid addition salts, whose formation frequently provides a ready means of purification, may be converted to the free base by neutralization, e.g. with sodium hydroxide. Quaternary salts may be produced by reacting the base with quaternizing agents such as alkyl halides, alkyl sulfates, alkyl nitrates and the like, e.g. methyl chloride, methyl bromide, ethyl chloride, ethyl iodide, propyl bromide, butyl chloride, etc., methyl sulfate, ethyl sulfate, ethyl nitrate, etc., aralkyl halides, aralkyl sulfates and the like, e.g. benzyl chloride, benzyl bromide, phenethyl sulfate, etc.

The compounds of this invention have a variety of biological activities useful for therapeutic purposes. They are active against organisms such as *T. vaginalis, C. albicans* and *E. histolytica* and are therefore useful as antifungal, anti-protozoan and antiamebic agents. Compounds of this series are also ganglionic blocking agents and are useful as hypotensive agents. They furthermore act on the central nervous system. They may be administered orally or parenterally in conventional solid or liquid forms such as tablets, capsules, elixirs, ointments, injectables and the like by incorporating therapeutic dosages of the free base or medicinally acceptable salt thereof in appropriate vehicles according to accepted pharmaceutical practice.

The following examples are illustrative of the invention but not limitative thereof. All temperatures are expressed on the centigrade scale. All melting points are corrected.

Example 1

To 54.4 g. (0.2 mol) of N-[1-methyl-3-(2,6,6-trimethyl-1-cyclohexen-1-yl)propyl]-α-chloroacetamide dissolved in 100 ml. of dry toluene were added 30.6 g. (0.3 mol) of 3-dimethylaminopropylamine and 42.4 g. (0.4 mol) of sodium carbonate (anhydrous powder). The mixture was stirred and refluxed for 26 hours, cooled, rendered strongly alkaline with dilute sodium hydroxide, then extracted with ether. The organic layer was separated, washed thoroughly with water, dried over anhydrous sodium sulfate and concentrated at steam temperature under water vacuum. The residual oil was dissolved in ethanol, the solution was made acidic to Congo red by adding ethanolic hydrogen chloride and concentrated at steam temperature under water vacuum. The residual gum was crystallized from ethanol-acetonitrile-ether. The α - [3 - dimethylaminopropylamino] - N - [1 - methyl - 3- (2,6,6-trimethyl-1-cyclohexen-1-yl)propyl]-acetamide dihydrochloride melted at 170–172° (with dec.).

The dihydrochloride obtained above was neutralized with aqueous sodium hydroxide and extracted with ether. The ether extract was evaporated to dryness to give the free base, α-[3-dimethylaminopropylamino]-N-[1-methyl-3 - (2,6,6 - trimethyl - 1 - cyclohexen - 1 - yl)propyl]-acetamide, as a pale yellow oil.

Example 2

To 13.5 g. (0.04 mol) of α-[3-dimethylaminopropylamino] - N - [1 - methyl - 3 - (2,6,6 - trimethyl - 1 - cyclohexen-1-yl)propyl]-acetamide were added 25 ml. (0.4 mol) of formic acid (90%). The resulting solution was cooled, then 3.9 ml. (0.044 mol) of formaldehyde (37%) were added. The solution was heated at steam temperature with occasional shaking for three hours and then refluxed for four hours. The volatiles were distilled off at steam temperature under water vacuum. The residual oil, comprising the crude free base, was dissolved in excess ethanolic hydrogen chloride and the solution was evaporated to dryness. The residual gum was crystallized from ethanol-acetonitrile-ether to obtain α-[N-methyl - 3 - dimethylaminopropylamino] - N - [1 - methyl - 3- (2,6,6-trimethyl-1-cyclohexen-1-yl)propyl]-acetamide dihydrochloride hemihydrate, M.P. 173–174° (with dec.).

Example 3

54.4 g. (0.2 mol) of N-[1-methyl-3-(2,6,6-trimethyl-1-cyclohexen-1-yl)propyl]-α-chloroacetamide and 35 g. (0.3 mol) of 2-diethylaminoethylamine were reacted according to the procedure of Example 1 to obtain α-[2-diethylaminoethylamino] - N - [1 - methyl - 3 - (2,6,6 - trimethyl-1 - cyclohexen - 1 - yl)propyl] - acetamide dihydrochloride monohydrate, M.P. 96–98° (crystallized from acetonitrile ether).

Example 4

54.4 g. (0.2 mol) of N-[1-methyl-3-(2,6,6-trimethyl-1-cyclohexen-1-yl)propyl]-α-chloroacetamide and 39 g. (0.3 mol) of 3-diethylaminopropylamine were reacted according to the procedure described in Example 1 to obtain α - [3 - diethylaminopropylamino] - N - [1 - methyl - 3- (2,6,6 - trimethyl - 1 - cyclohexen - 1 - yl)propyl] - acetamide. Addition of an excess of oxalic acid dissolved in ether gave the α-[3-diethylaminopropylamino]-N-[1-methyl - 3 - (2,6,6 - trimethyl - 1 - cyclohexen - 1 - yl)propyl]-acetamide dioxalate which was crystallized from 60% ethanol, M.P. 196–197° (with dec.).

Example 5

To 116 g. (0.5 mol) of β-$C_{16}$-aldehyde suspended in 300 ml. of ice cold methanol were added 6 teaspoons of Raney nickel and 70 ml. of liquid ammonia. The mixture was hydrogenated at 100° under a pressure of 1,000 p.s.i. The catalyst was filtered off and the solution was concentrated. The residual oil was fractionated in vacuo to obtain 4-methyl-6-(2,6,6-trimethyl-1-cyclohexen-1-yl)-hexylamine, B.P.$_{0.2}$ 106–110°. An aliquot, when treated with a solution of oxalic acid in ether, gave the crystalline oxalate hemihydrate, M.P. 158–160°, with sintering at 120° (crystallized from 95% ethanol).

35.2 g. (0.31 mol) of chloroacetyl chloride were added slowly over a period of one hour at a temperature of 4° to a well stirred suspension containing 73 g. (0.31 mol) of 4-methyl-6-(2,6,6-trimethyl-1-cyclohexen-1-yl)hexylamine in 280 ml. of ether and 180 ml. of water. The reaction mixture was maintained alkaline to phenolphthalein with periodic additions of 15% potassium hydroxide. The mixture was stirred at 4° for an additional two hours. The ether layer was then separated, washed with water, dilute hydrochloric acid and water, then dried over anhydrous sodium sulfate. It was then concentrated and the residual oil was fractionated in vacuo to obtain N-[4-methyl - 6 - (2,6,6 - trimethyl - 1 - cyclohexen - 1 - yl)-hexyl]-α-chloroacetamide, B.P.$_{0.01}$ 156–157°.

22 g. (0.07 mol) of N[4-methyl-6-(2,6,6-trimethyl-1-cyclohexen-1-yl)hexyl]-α-chloroacetamide, 10.7 g. (0.11 mol) of 3-dimethylaminopropylamine and 14.8 g. (0.14 mol) of anhydrous sodium carbonate were reacted according to the procedure described in Example 4 to obtain α - [3 - dimethylaminopropylamino] - N - [4 - methyl - 6- (2,6,6-trimethyl-1-cyclohexen-1-yl)hexyl]-acetamide dioxalate, M.P.161–163°, with dec. (crystallized from water-ethanol).

Example 6

54 g. (0.2 mol) of β-$C_{19}$-aldehyde were reduced in the presence of excess liquid ammonia according to the procedure of Example 5 to obtain 2,6-dimethyl-8-(2,6,6-trimethyl-1-cyclohexen-1-yl)octylamine, B.P.$_{0.5}$ 141–145°. An aliquot, when treated with a solution of oxalic acid in ether and crystallized from 90% acetone, gave crystalline 2,6 - dimethyl - 8 - (2,6,6 - trimethyl - 1 - cyclohexen - 1-yl)octylamine oxalate hemihydrate, M.P 138–140°, with sintering at 110°

33 g. (0.12 mol) of 2,6-dimethyl-8-(2,6,6,-trimethyl-1-cyclohexen-1-yl)octylamine and 13.6 g. (0.12 mol) of chloroacetyl chloride were reacted according to the procedure described in Example 5 to obtain N-[2,6-dimethyl-8 - (2,6,6 - trimethyl - 1 cyclohexen - 1 - yl)octyl] - α-chloroacetamide, B.P.$_{0.25}$ 192°.

26.6 g. (0.076 mol) of the chloroacetamide obtained above and 11.6 g. (0.114 mol) of 3-dimethylaminopropylamine were reacted according to the procedure described in Example 4 to obtain α-[3-dimethylaminopropylamino] - N - [2,6 - dimethyl - 8 - (2,6,6 - trimethyl - 1-cyclohexen-1-yl)octyl]-acetamide dioxalate, M.P. 177–179°, with dec. (crystallized from methanol).

Example 7

44 g. (0.13 mol) of α-[3-dimethylaminopropylamino]-N - [1 - methyl-3-(2,6,6-trimethyl-1-cyclohexen-1-yl)propyl]-acetamide, obtained as described in Example 1, were dissolved in 240 ml. of absolute ether and added over a period of one hour to a stirred suspension of 16.6 g.

(0.44 mol) of lithium aluminum hydride in 1 liter of absolute ether. The reaction mixture was stirred and refluxed for four hours and then cooled. 100 ml. of ethyl acetate were slowly added, followed by the addition of 350 ml. of water-wet ether and then 150 g. of sodium chloride and 90 ml. of water. The solid which formed was filtered off and washed with ether. The filtrate and ether washings were combined, washed with water, dried over anhydrous sodium sulfate and the ether was distilled off. 40 g. of residual oil comprising crude N-(3-dimethylaminopropyl) - N' - [1 - methyl - 3 - (2,6,6 - trimethyl - 1 - cyclohexen - 1 - yl)propyl] - ethylenediamine were dissolved in ethanol, alcoholic hydrogen chloride was added until the solution was acid to Congo red and the volatiles were distilled off. The residue was crystallized from ethanol-acetonitrile-ether. The N-(3-dimethylaminopropyl) - N' - [1 - methyl - 3 - (2,6,6 - trimethyl - 1 - cyclohexen - 1 - yl)propyl] - ethylenediamine trihydrochloride hemihydrate melted at 194–195°, with sintering at 180°.

*Example 8*

To 16 g. (0.036 mol) of N-(3-dimethylaminopropyl)-N' - [1 - methyl - 3 - (2,6,6 - trimethyl - 1 - cyclohexen - 1-yl)propyl]-ethylenediamine were added 29 ml. (0.48 mol) of formic acid (90%). The resulting solution was cooled, then 14.5 ml. (0.165 mol) of formaldehyde (37%) were added. The solution was heated at steam temperature with occasional shaking for 3 hours and then refluxed for 4 hours. The volatiles were distilled off at steam temperature under water vacuum. The residual oil was dissolved in excess ethanolic hydrogen chloride and the solution was evaporated to dryness. The residual gum was crystallized from methanol-acetone to obtain N - (3 - dimethylaminopropyl)-N'-[1-methyl-3-(2,6,6 - trimethyl - 1 - cyclohexen - 1 - yl)propyl]-N,N' - dimethylethylenediamine trihydrochloride hemihydrate, M.P. 204–206°, with dec.

*Example 9*

To 290 g. (1.52 mols) of β-ionone suspended in ice cold methanol were added 6 tsps. of Raney nickel and 197 g. (1.68 mols) of 3-(2-hydroxyethylamino)propylamine. The mixture was hydrogenated at 100° under pressure of 1,000 p.s.i. The catalyst was filtered off and the solution was concentrated. The residual oil was fractionated in vacuo to obtain N'-(2-hydroxyethyl)-N-[1-methyl - 3 - (2,6,6, - trimethyl - 1 - cyclohexen - 1 - yl) - propyl]-1,3-propanediamine, B.P.$_{0.5}$ 178–183°. An aliquot, when treated with alcoholic hydrogen chloride and crystallized from ethanol, gave the crystalline dihydrochloride, M.P. 235–237°.

To 116 g. (0.4 mol) of N'-(2-hydroxyethyl)-N-[1-methyl - 3 - (2,6,6 - trimethyl - 1 - cyclohexen - 1 - yl) - propyl] - 1,3-propanediamine were added 160 ml. (2.67 mols) of formic acid (90%). The resulting solution was cooled, then 80 ml. (0.91 mol) of formaldehyde (37%) were added. The solution was heated at steam temperature with occasional shaking for 3 hours and then refluxed for 4 hours. The volatiles were distilled off at steam temperature under water vacuum. The residual oil was dissolved in excess ethanolic hydrogen chloride and the solution was evaporated to dryness. The residual gum was crystallized from ethanol-ether to obtain N' - (2 - hydroxyethyl) - N - [1 - methyl - 3 - (2,6,6 - trimethyl - 1 - cyclohexen - 1 - yl)propyl] - N,N' - dimethyl-1,3-propanediamine dihydrochloride hemihydrate, M.P. 116–118°.

To a solution of 40.7 g. (0.1 mol) of N'-(2-hydroxyethyl) - N - [1 - methyl - 3 - (2,6,6 - trimethyl - 1 - cyclohexen - 1 - yl)propyl] - N,N' - dimethyl - 1,3 - propanediamine dihydrochloride hemihydrate in 500 ml. of chloroform which had been saturated with hydrogen chloride at 4° were slowly added 22 ml. (0.32 mol) of thionyl chloride over a half-hour period. The solution was stirred for an additional 1½ hours at 4°, allowed to warm to room temperature and then refluxed for six hours. The volatiles were distilled off at steam bath temperature under water vacuum. To the residue were added 28 g. (0.6 mol) of dimethylamine dissolved in 100 ml. of ethanol. The resulting solution was heated in a sealed tube at 100° under 500 p.s.i. of nitrogen for 18 hours. The volatiles were distilled off, the residue was made strongly alkaline with aqueous potassium hydroxide and extracted with ether. The ether extract was washed with water, dried over anhydrous sodium sulfate and the ether was distilled off. The residue, N-(2 - dimethylaminoethyl) - N' - [1 - methyl - 3 - (2,6, 6 - trimethyl - 1 - cyclohexen - 1 - yl)propyl]- N,N' - dimethyl - 1,3-propanediamine, was dissolved in ethanolic hydrogen chloride. The volatiles were removed and the resulting gum was crystallized from ethanol-hexane to obtain N - (2-dimethylaminoethyl)-N'-[1-methyl-3-(2,6, 6 - trimethyl - 1 - cyclohexen - 1 - yl)propyl] - N,N' - dimethyl-1,3-propanediamine trihydrochloride sesquihydrate, M.P. 227–239°, with dec.

*Example 10*

212 g. (4 mols) of acrylonitrile were added, with stirring, to 612 g. (6 mols) of 3-dimethylaminopropylamine over a two hour period so that the reaction temperature remained below 30°. The solution, at room temperature, was stirred for five hours and then stored for four days. It was then fractionally distilled giving 3-(3-dimethylaminopropylamino)propionitrile, B.P.$_{17}$ 130°.

To 193.5 (1.24 mols) of 3-(dimethylaminopropylamino)-propionitrile dissolved in 500 ml. of 10% ammonia in ethanol, were added 6 teaspoons of Raney nickel. The mixture was hydrogenated at 100° and 1,000 p.s.i. The catalyst was filtered off and the volatiles were removed from the filtrate by distillation. The residual oil was fractionated in vacuo to obtain N-(3-dimethylaminopropyl) - 1,3-propanediamine, B.P.$_{0.1}$ 67°. An aliquot, when treated with ethanolic hydrogen chloride and crystallized from methanol-ether, gave the crystalline trihydrochloride, M.P. 219–220°.

4 teaspoons of Raney nickel were added to 76 g. (0.4 mol) of β-ionone and 67 g. (0.42 mol) of N-(3-dimethylaminopropyl)-1,3-propanediamine. The mixture was diluted with ethanol to 300 ml. and hydrogenated at 100° and 1,000 p.s.i. The catalyst was filtered off and the volatiles were removed from the filtrate by distillation. The residual oil was fractionated in vacuo to obtain N - (3 - dimethylaminopropyl) - N' - [1 - methyl - 3 - (2,6,6 - trimethyl - 1 - cyclohexen - 1 - yl)propyl]-1,3-propanediamine in the form of an oil, B.P.$_{0.3}$ 155–168°. The oil was dissolved in ethanol, ethanolic hydrogen chloride was added until acid to Congo red and the solution was then evaporated to dryness. The residual solid, N - (3 - dimethylaminopropyl) - N' - [1-methyl - 3 - (2,6,6 - trimethyl - 1 - cyclohexen - 1 - yl)-propyl] - 1,3 - propanediamine trihydrochloride hemihydrate, was crystallized from ethanol, M.P. 262–264°, with dec.

*Example 11*

33.7 g. (0.1 mol) of N-(3-dimethylaminopropyl)-N'-[1 - methyl - 3 - (2,6,6 - trimethyl - 1 - cyclohexen - 1-yl)propyl]-1,3-propanediamine, 40 ml. (0.67 mol) of formic acid (90%) and 20 ml. (0.23 mol) of formaldehyde (37%) were reacted according to the procedure described in Example 9 to obtain N-(3-dimethylaminopropyl) - N' - [1 - methyl - 3 - (2,6,6 - trimethyl - 1-cyclohexen - 1 - yl)propyl] - N,N' - dimethyl - 1,3 - propanediamine trihydrochloride hemihydrate, M.P. 259–261°, with dec.

An aqueous solution containing 16.1 g. (0.03 mol) of the hydrochloride obtained above was made alkaline with sodium carbonate and extracted with ether. The ether extract was washed with water, dried over anhydrous sodium sulfate and the ether was distilled off. The residual oil comprising N-(3-dimethylaminopropyl)-

N' - [1 - methyl - 3 - (2,6,6 - trimethyl - 1 - cyclohexen- 1 - yl)propyl] - N,N' - dimethyl - 1,3 - propanediamine was dissolved in dry benzene and the benzene was distilled off.

*Example 12*

The residual oil comprising N - (3 - dimethylaminopropyl) - N' - [1 - methyl - 3 - (2,6,6 - trimethyl - 1 - cycyohexen - 1 - yl)propyl] - N,N' - dimethyl - 1,3 - propanediamine obtained in Example 11 was dissolved in 250 ml. of acetone containing 80 g. of methyl bromide. The solution was stored in a tightly stoppered flask at room temperature for 15 hours. The crystals which formed were filtered off, washed with acetone and recrystallized from isopropanol-acetone. The N - (3 - dimethylaminopropyl) - N' - [1 - methyl - 3 - (2,6,6 - trimethyl - 1 - cyclohexen - 1 - yl)propyl] - N,N' - dimethyl-1,3-propanediamine tri(methyl bromide) monohydrate melted at 210–213°, with dec.

*Example 13*

123.6 g. (0.6 mol) of β-$C_{14}$-aldehyde and 61.2 g. (0.6 mol) of 2-hydroxyethylethylenediamine were reductively condensed according to the procedure described in Example 9 to obtain N'-(2-hydroxyethyl)-N-[2-methyl-4-(2,6,6 - trimethyl - 1 - cyclohexen - 1 - yl)butyl] - ethylenediamine, B.P.$_{0.1}$ 165°. An aliquot, when treated with ethanolic hydrogen chloride and crystallized from methanol-ether, gave the crystalline dihydrochloride monohydrate, M.P. 229–231°, with sintering at 175°.

143 g. (0.5 mol) of N'-(2-hydroxyethyl)-N-[2-methyl-4 - (2,6,6 - trimethyl - 1 - cyclohexen - 1 -yl)butyl]-ethylenediamine, 200 ml. (3.35 mols) of formic acid (90%) and 100 ml. (1.15 mols) formaldehyde (37%) were reacted according to the procedure described in Example 9 to obtain N'-(2-hydroxyethyl)-N-[2-methyl-4 - (2,6,6 - trimethyl - 1 - cyclohexen - 1 - yl)butyl]-N,N'-dimethylethylenediamine dihydrochloride monohydrate, M.P. 195–197° (crystallized from ethanol-ether).

To 50 g. (0.12 mol) of N'-(2-hydroxyethyl)-N-[2-methyl - 4 - (2,6,6 - trimethyl - 1 - cyclohexen - 1 - yl) - butyl] - N,N' - dimethylethylenediamine dihydrochloride monohydrate dissolved in 700 ml. of chloroform which had been saturated with hydrogen chloride at 4° was slowly added 34 ml. (0.49 mol) of thionyl chloride over a period of one hour. The solution was stirred for an additional two hours at 4°, allowed to warm to room temperature and then refluxed and stirred for six hours. The mixture was then cooled and the precipitate which formed was filtered off. The filtrate was evaporated to dryness, the residue was combined with the precipitated material and crystallized from methanol-acetone-ether to obtain N' - (2 - chloroethyl) - N - [2-methyl - 4 - (2,6,6 - trimethyl - 1 - cyclohexen - 1 - yl)-butyl] - N,N' - dimethylethylenediamine dihydrochloride monohydrate, M.P. 179–181°.

To 44.3 g. (0.1 mol) of N'-(2-chloroethyl)-N-[2-methyl - 4 - (2,6,6 - trimethyl - 1 - cyclohexen - 1 - yl)-butyl] - N,N' - dimethylethylenediamine dihydrochloride monohydrate were added 33.4 g. (0.58 mol) of dimethylamine in 200 ml. of methanol. The mixture was heated in a sealed tube under 500 p.s.i. of nitrogen at 100° for 18 hours. The volatiles were distilled off, the residue was made strongly alkaline with aqueous sodium hydroxide and extracted with ether. The ether extract was washed with water, dried over anhydrous sodium sulfate and the ether was distilled off. The residue, comprising crude 1 - [2 - methyl - 4 - (2,6,6 - trimethyl-1 - cyclohexen - 1 - yl)butyl] - 1,4,7,7 - tetramethyl diethylenetriamine, was dissolved in ethanol, ethanolic hydrogen chloride was added until acid to Congo red and then the solution was concentrated. The resulting gum was crystallized from methanol-ether to obtain 1 - [2-methyl - 4 - (2,6,6 - trimethyl - 1 - cyclohexen - 1 - yl)-butyl] - 1,4,7,7 - tetramethyldiethylenetriamine trihydrochloride, M.P. 252–254°.

*Example 14*

An aqueous solution containing 9.2 g. (0.02 mol) of 1 - [2 - methyl - 4 - (2,6,6 - trimethyl - 1 - cyclohexen-1 - yl)butyl] - 1,4,7,7 - tetramethyldiethylenetriamine trihydrochloride was rendered alkaline with sodium carbonate and extracted with ether. The ether extract was washed with water, dried over anhydrous sodium sulfate and concentrated. The residual oil was dissolved in dry benzene and then the benzene was distilled off. The oil was then dissolved in 50 ml. of methanol and 15 ml. of methyl iodide were added. The solution, after standing at room temperature for 48 hours, was evaporated to dryness. The residual solid, 1-[2-methyl-4-(2,6,6 - trimethyl - 1 - cyclohexen - 1 - yl)butyl] - 1,4,7,7-tetramethyldiethylenetriamine tri(methiodide) monohydrate, was crystallized from ethanol, M.P. 190–192°, with dec.

*Example 15*

To 58 9. (0.5 mol) of 4-dimethylaminobutylamine were added 21.2 g. (0.4 mol) of acrylonitrile over a two hour period at a temperature below 30° with stirring. The reaction mixture was stirred for five hours at room temperature, then one hour at 100°, and finally fractionally distilled. 56 g. of the distillate boiling at 103–105° at 0.7 mm. were dissolved in 100 ml. of 10% ammonia in ethanol and reduced in the presence of Raney nickel catalyst at 800 p.s.i. of hydrogen and 70°. The catalyst was filtered off, the solution was concentrated and the residual oil was fractionally distilled to obtain N-(4-dimethylaminobutyl)-1,3-propanediamine, B.P.$_{0.2}$ 75–76°.

3 teaspoons of Raney nickel were added to 30.5 g. (0.16 mol) of β-ionone and 30.0 g. of N-(4-dimethylaminobutyl)-1,3-propane diamine. Ethanol was added to a volume of 300 ml. The mixture was hydrogenated at 100° and a pressure of 1,000 p.s.i. The catalyst was filtered off, the filtrate was concentrated and the residual oil was fractionated in vacuo to obtain N-(4-dimethylaminobutyl) - N' - [1-methyl-3-(2,6,6-trimethyl-1-cyclohexen-1-yl)propyl] - 1,3 - propanediamine, B.P.$_{0.05}$ 170–182°. An aliquot, when treated with an excess of hydrogen chloride in ethanol and crystallized from ethanol, gave the crystalline tri-hydrochloride, M.P. 274–276°, with dec.

*Example 16*

To 30 g. (0.08 mol) of N-(4-dimethylaminobutyl)-N'-[1-methyl - 3 - (2,6,6-trimethyl-1-cyclohexen-1-yl)propyl]-,3-propanediamine were added 40 ml. (0.67 mol) of formic acid (90%). The resulting solution was cooled, then 20 ml. (0.23 mol) of formaldehyde (37%) were added. The solution was heated at steam temperature with occasional shaking for one hour and then refluxed for eight hours. The volatiles were distilled off at steam temperature under water vacuum. The residual oil, comprising crude N-(4-dimethylaminobutyl)-N'-[1-methyl-3-(2,6,6-trimethyl - 1 - cyclohexen-1-yl)propyl]-N,N'-dimethyl-1,3-propanediamine, was dissolved in excess ethanolic hydrogen chloride and the solution was evaporated to dryness. The resulting gum was crystallized from ethanol-ethyl acetate to obtain N-(4-dimethylaminobutyl)-N'-[1-methyl - 3 - (2,6,6-trimethyl-1-cyclohexen-1-yl)-propyl]-N,N'-dimethyl-1,3-propanediamine trihydrochloride monohydrate, M.P. 236–238°, with dec.

*Example 17*

To 300 mg. of rhodium-on-carbon were added 10 g. (0.02 mol) of N-(3-dimethylaminopropyl)-N'-[1-methyl-3-(2,6,6-trimethyl - 1 - cyclohexen-1-yl)propyl]-1,3-propanediamine trihydrochloride hemihydrate dissolved in 100 ml. of ethanol. The mixture was hydrogenated at 100° and a pressure of 1,000 p.s.i. The catalyst was filtered off and the filtrate was concentrated. The residual solid, N-(3-dimethylaminopropyl)-N'-[1-methyl-3-(2,6,6-trimethylcyclohexyl)propyl] - 1,3 - propanediamine trihydrochloride, was crystallized from methanol-acetonitrile, M.P. 262–264°, with dec.

*Example 18*

41.2 g. (0.2 mol) of cis-tetrahydroionone and 35.1 g. (0.22 mol) of N-(3-dimethylaminopropyl)-1,3-propanediamine were hydrogenated in the presence of Raney nickel catalyst according to the procedure described in Example 17 to obtain N-(3-dimethylaminopropyl)-N'-[1-methyl - 3 - (2,2,6-trimethylcyclohexyl)propyl]-1,3-propanediamine trihydrochloride, M.P. 262–264°, with dec. (crystallized from methanol-acetonitrile).

*Example 19*

82.5 g. (0.4 mol) of β-$C_{14}$-aldehyde and 67 g. (0.42 mol) of N-(3-dimethylaminopropyl)-1,3-propanediamine were hydrogenated in the presence of Raney nickel catalyst according to the procedure described in Example 15 to obtain N-(3-dimethylaminopropyl)-N'-[2-methyl-4-(2,6,6-trimethyl - 1 - cyclohexen-1-yl)butyl]-1,3-propanediamine, B.P.$_{0.3}$ 174°. An aliquot, when treated with ethanolic hydrogen chloride and crystallized from ethanol, gave the crystalline trihydrochloride dihydrate, M.P. 227–229°, with dec.

*Example 20*

35.1 g. (0.1 mol) of N-(3-dimethylaminopropyl)-N'-[2-methyl - 4 - (2,6,6-trimethyl-1-cyclohexen-1-yl)butyl]-1,3-propanediamine, 40 ml. of formic acid (90%) and 19 ml. of formaldehyde (37%) were reacted according to the procedure described in Example 16 to obtain N-(3-dimethylaminopropyl)-N'-[2-methyl - 4 - (2,6,6-trimethyl - 1 - cyclohexen - 1 - yl)butyl]-N,N'-dimethyl-1,3-propandiamine trihydrochloride monohydrate, M.P. 278–279°, with dec. (crystallized from ethanol).

*Example 21*

67.2 g. (0.29 mol) of 6-(2,6,6-trimethyl-1-cyclohexen-1-yl)-4-methyl-2,4-hexadien-1-al and 49 g. (0.31 mol) of N-(3-dimethylaminopropyl)-1,3- propanediamine were reacted according to the procedure described in Example 15 to obtain N-(3-dimethylaminopropyl)-N'-[4-methyl-6-(2,6,6 - trimethyl-1-cyclohexen-1-yl)hexyl]-1,3-propanediamine, B.P.$_{0.1}$ 176–181°. The latter was treated with ethanolic hydrogen chloride and crystallized from water-ethanol to obtain the crystalline trihydrochloride hemihydrate, M.P. 260–262°, with dec.

*Example 22*

80 g. (0.29 mol) of β-$C_{19}$-aldehyde and 49 g. (0.31 mol) of N-(3-dimethylaminopropyl)-1,3-propanediamine were reacted according to the procedure described in Example 15 to obtain N-(3-dimethylaminopropyl)-N'-[2,6-dimethyl - 8 - (2,6,6-trimethyl-1-cyclohexen-1-yl)octyl]-1,3-propandiamine, B.P.$_{0.1}$ 180–185°. The latter, when treated with ethanolic hydrogen chloride and crystallized from water-ethanol, gave the crystalline trihydrochloride sesquihydrate, M.P. 259–261°, with dec.

*Example 23*

31 g. (0.07 mol) of N-(3-dimethylaminopropyl)-N'-[2,6 - dimethyl - 8 - (2,6,6-trimethyl-1-cyclohexen-1-yl)octyl]-1,3-propanediamine, 30 ml. of formic acid (90%) and 15 ml. of formaldehyde (37%) were reacted according to the procedure described in Example 16 to obtain N - (3-dimethylaminopropyl)-N'-[2,6-dimethyl-8-(2,6,6-trimethyl - 1 - cyclohexen-1-yl)octyl]-N,N'-dimethyl-1,3-propanediamine trihydrochloride monohydrate, M.P. 227–229°, with dec. (crystallized from acetonitrile-ethanol).

*Example 24*

56 g. (0.29 mol) of α-ionone and 49 g. (0.31 mol) of N-(3-dimethylaminopropyl)-1,3-propanediamine were reacted according to the procedure described in Example 15 to obtain N-(3-dimethylaminopropyl)-N'-[1-methyl-3-(2,6,6 - trimethyl - 2 - cyclohexen-1-yl)-propyl]-1,3-propanediamine, B.P.$_{0.3}$ 171°. The latter, when treated with ethanolic hydrogen chloride and crystallized from ethanol, gave the crystalline trihydrochloride sesquihydrate, M.P. 250–252°, with dec.

*Example 25*

44.7 g. (0.1 mol) of N-(3-dimethylaminopropyl)-N'-[1 - methyl - 3 - (2,6,6 - trimethyl - 2 - cyclohexen - 1 yl)propyl]-1,3-propanediamine, 40 ml. of formic acid (90%) and 20 ml. of formaldehyde (37%) were reacted according to the procedure described in Example 16 to obtain N-(3-dimethylaminopropyl)-N'-[1-methyl-3-(2,6,6 - trimethyl - 2 - cyclohexen - 1 - yl)propyl] - N,N'-dimethyl - 1,3 - propanediamine trihydrochloride hemihydrate, M.P. 259–260°, with dec. (crystallized from ethanol).

*Example 26*

To 17 g. (0.038 mol) of N-(3-dimethylaminopropyl)-N' - [1 - methyl - 3 - (2,2,6 - trimethylcyclohexyl)propyl]-1,3-propanediamine, 20 ml. of formic acid (90%) and 14 ml. of formaldehyde (37%) were reacted according to the procedure in Example 16 to obtain N-(3-dimethylaminopropyl) - N' - [1 - methyl - 3 - (2,2,6 - trimethylcyclohexyl)propyl] - N,N' - dimethyl - 1,3 - propanediamine trihydrochloride, M.P. 262–264°, with dec. (crystallized from methanol-ether).

*Example 27*

54.4 g. (0.2 mol) of N-[1-methyl-3-(2,6,6-trimethyl-1-cyclohexen-1-yl)propyl]-α-chloroacetamide and 42.5 g. (0.3 mol) of N-aminopropylmorpholine were reacted according to the procedure described in Example 1 to obtain α-[3-(4-morpholinyl)propylamino]-N-[1-methyl-3-(2,6,6-trimethyl - 1 - cyclohexen-1-yl)propyl]-acetamide dihydrochloride monohydrate, M.P. 193–195°, with dec.

*Example 28*

96 g. (0.5 mol) of isoionone [4-(5-isopropenyl-2-methyl-1-cyclopenten-1-yl)-2-butanone] were reductively condensed with excess ammonia according to the procedure described in Example 5 to obtain 1-methyl-3-(2-methyl-5-isopropyl-1-cyclopenten-1-yl)propylamine, B.P.$_{.9}$ 61°.

68 g. (0.35 mol) of 1-methyl-3-(2-methyl-5-isopropyl-1-cyclopenten-1-yl)propylamine and 40 g. (0.35 mol) of chloroacetyl chloride were reacted according to the procedure described in Example 5 to obtain N-[1-methyl-3-(2 - methyl - 5 - isopropyl - 1 - cyclopenten - 1 - yl)propyl]-α-chloroacetamide, B.P.$_{0.06}$ 135°.

23 g. (0.084 mol) of N-[1-methyl-3-(2-methyl-5-isopropyl - 1 - cyclopenten - 1 - yl)propyl] - α - chloroacetamide and 12.8 g. (0.13 mol) of 3-dimethylaminopropylamine were reacted according to the procedure described in Example 4 to obtain α-[3-dimethylaminopropylamino]-N - [1 - methyl - 3 - (2 - methyl - 5 - isopropyl - 1 - cyclopenten-1-yl)propyl] - acetamide dioxalate monohydrate, M.P. 173–175° (crystallized from methanol).

*Example 29*

76 g. (0.4 mol) of isoionone and 67 g. (0.42 mol) of N-(3-dimethylaminopropyl)-1,3-propanediamine were reacted in the presence of Raney nickel and hydrogen according to the procedure described in the second paragraph of Example 15 to obtain N-(3-dimethylaminopropyl) - N' - [1 - methyl - 3 - (2 - methyl - 5 - isopropyl-1 - cyclopenten - 1 - yl)propyl] - 1,3 - propanediamine, B.P.$_{0.15}$ 182°.

34.1 g. (0.1 mol) of N-(3-dimethylaminopropyl)-N'-[1 - methyl - 3 - (2 - methyl - 5 - isopropyl - 1 - cyclopenten-1-yl)propyl]-1,3-propanediamine, 40 ml. of formic acid (90%) and 20 ml. of formaldehyde (37%) were reacted according to the procedure described in Example 16 to obtain N-(3-dimethylaminopropyl)-N'-[1-methyl-3 - (2 - methyl - 5 - isopropyl - 1 - cyclopenten - 1 - yl)-propyl]-N,N'-dimethyl-1,3-propanediamine trihydrochloride sesquihydrate, M.P. 263–265°, with dec. (crystallized from ethanol-acetonitrile).

*Example 30*

6 teaspoons of Raney nickel (ethanol washed) were added to 78.6 g. (0.39 mol) of 3-[3-(4-morpholinyl)-propylamino]-propylamine and 68.5 g. (0.35 mol) of cis-tetrahydroionone in 200 ml. of ethanol. The mixture was hydrogenated at 100° and at a pressure of 1,000 p.s.i. The catalyst was filtered off and the solution was concentrated. The residual oil was fractionated in vacuo to obtain N-[3-(4-morpholinyl)propyl]-N'-[1-methyl-3-(2,2,6 - trimethylcyclohexyl)propyl]-1,3-propanediamine, B.P.$_{0.05}$ 171–186°, $n_D^{23}$ 1.14901. An aliquot when treated with an excess of hydrogen chloride in ethanol, gave the crystalline trihydrochloride. After crystallization from 95% ethanol-ether, it decomposed at 288°.

To 36 g. (0.097 mol) of N-[3-(4-morpholinyl)propyl]-N' - [1 - methyl - 3 - (2,2,6 - trimethylcyclohexyl)propyl]-1,3-propanediamine were slowly added 65 ml. (1.27 mols) of formic acid (90%). The resulting solution was cooled and 45 ml. (0.52 mol) of formaldehyde (37%) were then added. The mixture was heated at steam bath temperature with occasional shaking for 2 hours and then refluxed for 8 hours. The volatiles were distilled off, the residual oil was dissolved in excess ethanolic hydrogen chloride and the solution was then evaporated to dryness. The resulting gum was crystallized from ethanol to obtain N-[3-(4-morpholinyl)propyl] - N' - [1 - methyl - 3 - (2,2,6 - trimethylcyclohexyl)-propyl]-N,N'-dimethyl-1,3-propanediamine trihydrochloride, M.P. 281–283°, with dec.

*Example 31*

73.4 g. (0.37 mol) of 3-[3-(1-piperidyl)propylamino]-propylamine and 68.5 g. (0.35 mol) of cis-tetrahydroionone were reductively condensed according to the procedure described in Example 30 to obtain N-[3-(1-piperidyl)propyl] - N' - [1 - methyl - 3 - (2,2,6 - trimethylcyclohexyl)propyl] - 1,3 - propanediamine, B.P.$_{0.05}$ 195–205°, $n_D^{26}$ 1.4889. An aliquot, when treated with an excess of hydrogen chloride in ethanol, gave the crystalline trihydrochloride, M.P. 286–288°, with dec. (crystallized from water-acetone).

Treatment of 26.5 g. (0.07 mol) of N-[3-(1-piperidyl)-propyl] - N' - [1 - methyl - 3 - (2,2,6 - trimethylcyclohexyl)propyl] - 1,3 - propanediamine with 45 ml. (0.88 mol) of formic acid (90%) and 30 ml. (0.35 mol) of formaldehyde (37%) according to the procedure described in Example 30 yielded N-[3-(1-piperidyl)propyl]-N' - [1 - methyl - 3 - (2,2,6 - trimethylcyclohexyl)propyl]-N,N'-dimethyl-1,3-propanediamine trihydrochloride, M.P. 253–254°, with dec. (crystallized from methanol-ether).

*Example 32*

78.6 g. (0.39 mol) of 3-[3-(4-morpholinyl)propylamino]-propylamine and 68.5 g. (0.35 mol) of 4-(2-methyl-5-isopropylcyclopentyl)-2-butanone were reductively condensed according to the procedure described in Example 30 to yield N-[3-(4-morpholinyl)propyl]-N'-[1-methyl - 3 - (2 - methyl - 5 - isopropylcyclopentyl)propyl]-1,3-propanediamine, B.P.$_{0.06}$ 166–171°, $n_D^{23}$ 1.4846. An aliquot, when treated with an excess of hydrogen chloride in ethanol, gave the crystalline trihydrochloride hemihydrate, M.P. 285–288°, with dec. (crystallized from water-acetone).

Treatment of 23.5 g. (0.063 mol) of N-[3-(4-morpholinyl) - propyl] - N' - [1 - methyl - 3 - (2 - methyl - 5-isopropylcyclopentyl)propyl]-1,3-propanediamine with 65 ml. (1.27 mols) of formic acid (90%) and 45 ml. (0.52 mol) of formaldehyde (37%) according to the procedure described in Example 30 yielded N-[3-(4-morpholinyl)-propyl] - N' - [1 - methyl - 3 - (2 - methyl - 5 - isopropylcyclopentyl)propyl] - N,N' - dimethyl - 1,3 - propanediamine trihydrochloride sesquihydrate, M.P. 270–272°, with sintering at 235° (crystallized from water-ethanol).

*Example 33*

103 g. (0.5 mol) of α-irone and excess ammonia were reductively condensed according to the procedure described in Example 5 to obtain 1-methyl-3-(2,5,6,6-tetramethyl-2-cyclohexen-1-yl)propylamine, B.P.$_{0.1}$ 74°, $n_D^{27}$ 1.4785. An aliquot, when treated with an excess of phosphoric acid in ethanol, gave the crystalline diphosphate, M.P. 280–282°, with sintering at 135° (crystallized from ethanol-ether).

36.4 g. (0.174 mol) of 1-methyl-3-(2,5,6,6-tetramethyl-2-cyclohexen-1-yl)propylamine and 19.7 g. (0.174 mol) of chloro-acetyl chloride were reacted according to the procedure described in Example 5 to obtain N-[1-methyl-3 - (2,5,6,6 - tetramethyl - 2 - cyclohexen - 1 - yl)propyl]-α-chloroacetamide, B.P.$_{0.02}$ 130°, $n_D^{25}$ 1.5015.

20 g. (0.07 mol) of N-[1-methyl-3,-(2,5,6,6-tetramethyl-2-cyclohexen-1-yl)propyl]-α-chloroacetamide, and 10.7 g. (0.105 mol) of 3-dimethylaminopropylamine were reacted according to the procedure described in Example 1 to produce α-[3-dimethylamino-propylamino]-N-[1-methyl - 3 - (2,5,6,6 - tetramethyl - 2 - cyclohexen - 1 - yl) propyl]-acetamide dihydrochloride monohydrate, M.P. 156–158°, with sintering at 135° (crystallized from ethanol-acetonitrile-ether).

*Example 34*

82.5 g. (0.4 mol) of α-irone and 67 g. (0.42 mol) of N-(3-dimethylaminopropyl)-1,3-propanediamine were reacted according to the procedure described in Example 15 to obtain N-(3-dimethylaminopropyl)-N'-[1-methyl-3-(2,5,6,6 - tetramethyl - 2 - cyclohexen - 1 - yl)propyl]-1,3-propanediamine, B.P.$_{0.1}$ 175°, $n_D^{26}$ 1.4845. An aliquot, when treated with ethanolic hydrogen chloride, gave the crystalline trihydrochloride monohydrate, M.P. 243–244°, with dec. (crystallized from ethanol).

*Example 35*

35.2 g. (0.1 mol) of N-(3-dimethylaminopropyl)-N'-[1 - methyl - 3 - (2,5,6,6 - tetramethyl - 2 - cyclohexen-1-yl)propyl]-1,3-propane-diamine, 40 ml. of formic acid (90%) and 20 ml. of formaldehyde (37%) were reacted according to the procedure described in Example 16 to produce N-(3-dimethylaminopropyl)-N'-[1-methyl-3 - (2,5,6,6 - tetramethyl - 2 - cyclohexen - 1 -yl)-propyl]-N,N'-dimethyl-1,3-propanediamine trihydrochloride hemihydrate, M.P. 252–253°, with dec. (crystallized from ethanol).

We claim:
1. A compound selected from the group consisting of triamines represented by the formula

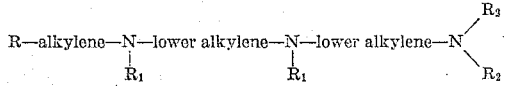

wherein R represents the cyclic moiety of a member selected from the group consisting of saturated and unsaturated ionone, irone and isoionone, $R_1$ represents a member of the group consisting of hydrogen and lower alkyl, and the group

represents a tertiary amino radical selected from the group consisting of di-lower alkylamino and, when taken together, polymethylene and polymethyleneoxy groups forming a saturated 5 to 6 membered monocyclic ring containing one hetero-nitrogen atom and up to one hetero-oxygen atom, medicinally acceptable acid addition salts and medicinally acceptable quaternary salts of said triamines, said quaternary salts being selected from the group consisting of alkyl and aralkyl quaternary salts.

2. A compound represented by the formula

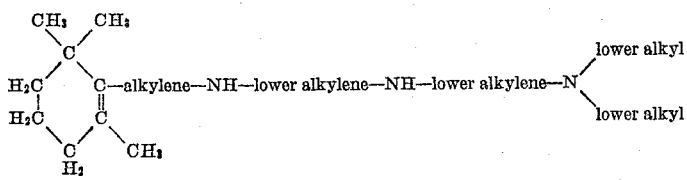

3. A compound represented by the formula

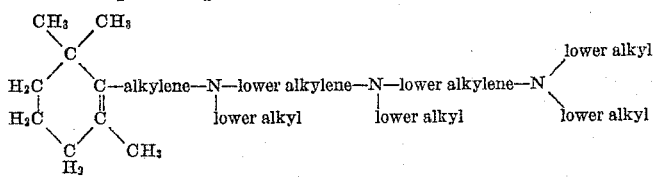

4. A compound represented by the formula

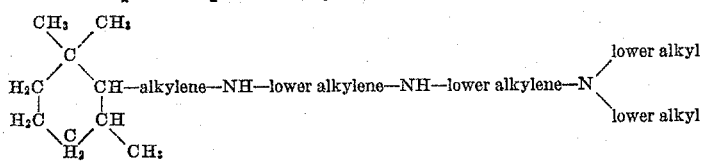

5. A compound represented by the formula

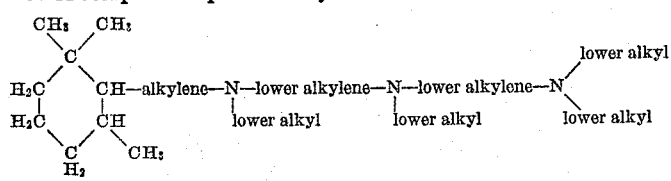

6. N - (3 - dimethylaminopropyl) - N' - [1 - methyl-3 - (2,2,6 - trimethylcyclohexyl)propyl] - N,N' - dimethyl - 1,3 - propanediamine.

7. N - (3 - dimethylaminopropyl) - N' - [1 - methyl-3 - (2,2,6 - trimethylcyclohexyl)propyl] - N,N' - dimethyl - 1,3 - propanediamine hydrochloride.

8. N - (3 - dimethylaminopropyl) - N' - [2 - methyl-4 - (2,6,6 - trimethyl - 1 - cyclohexen - 1 - yl) - butyl] - N,N' - dimethyl - 1,3 - propanediamine hydrochloride.

9. N - (3 - dimethylaminopropyl) - N' - [1 - methyl-3 - (2,6,6 - trimethyl - 1 - cyclohexen - 1 - yl)propyl] - N,N' - dimethyl - 1,3 - propanediamine.

10. N - (3 - dimethylaminopropyl) - N' - 1 - methyl-3 - (2,6,6 - trimethyl - 1 - cyclohexen - 1 - yl)propyl] - 1,3 - propanediamine hydrochloride.

11. A compound selected from the group consisting of amino-diamines represented by the formula

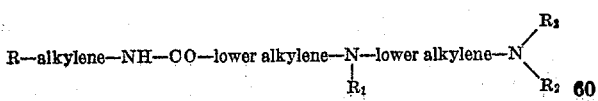

wherein R represents the cyclic moiety of a member selected from the group consisting of saturated and unsaturated ionone, irone and isoionone, $R_1$ represents a member of the group consisting of hydrogen and lower alkyl, and the group

represents a tertiary amino radical selected from the group consisting of di-lower alkylamino and, when taken together, polymethylene and polymethyleneoxy groups forming a saturated 5 to 6 membered monocyclic ring containing one hetero-nitrogen atom and up to one hetero-oxygen atom, medicinally acceptable acid addition salts and medicinally acceptable quaternary salts of said triamines, said quaternary salts being selected from the group consisting of alkyl and aralkyl quaternary salts.

12. α - [3 - dimethylaminopropylamino] - N - [1-methyl - 3 - (2,6,6 - trimethyl - 1 - cyclohexen - 1 yl) propyl] - acetamide.

13. α - [3 - (4 - morpholinyl)propylamino] - N - [1-methyl - 3 -(2,6,6 - trimethyl - 1 - cyclohexen - 1 - yl) propyl] - acetamide.

References Cited in the file of this patent
UNITED STATES PATENTS

| | | |
|---|---|---|
| 2,576,106 | Cusic | Nov. 27, 1951 |
| 2,705,244 | Goldberg et al. | Mar. 29, 1955 |
| 2,736,746 | Goldberg et al. | Feb. 28, 1956 |